United States Patent
Hilmann et al.

(10) Patent No.: US 8,733,485 B2
(45) Date of Patent: May 27, 2014

(54) FRONT MODULE FOR A MOTOR VEHICLE

(75) Inventors: Joergen Hilmann, Leverkusen (DE); Bert Niessen, Heimbach (DE); Bernd Linden, Neunkirchen-Seelscheid (DE)

(73) Assignee: Ford-Werke GmbH, Cologne (DE)

( * ) Notice: Subject to any disclaimer, the term of this patent is extended or adjusted under 35 U.S.C. 154(b) by 158 days.

(21) Appl. No.: 13/282,598

(22) Filed: Oct. 27, 2011

(65) Prior Publication Data

US 2012/0104797 A1 May 3, 2012

(30) Foreign Application Priority Data

Oct. 28, 2010 (DE) .......................... 10 2010 043 035

(51) Int. Cl.
*B60K 11/04* (2006.01)

(52) U.S. Cl.
USPC ........................................ 180/68.4; 180/68.6

(58) Field of Classification Search
USPC ................................................ 180/68.6, 232
See application file for complete search history.

(56) References Cited

U.S. PATENT DOCUMENTS

| 5,326,133 | A  | * | 7/1994  | Breed et al. ................... 280/735 |
| 6,412,581 | B2 | * | 7/2002  | Enomoto et al. .............. 180/68.4 |
| 6,758,515 | B2 | * | 7/2004  | Ozawa et al. ............ 296/187.09 |
| 7,044,246 | B2 | * | 5/2006  | Fujieda ......................... 180/68.4 |
| 7,410,018 | B2 | * | 8/2008  | Satou ............................ 180/68.4 |
| 7,628,237 | B2 | * | 12/2009 | Marqueling et al. .......... 180/68.4 |
| 7,726,428 | B2 | * | 6/2010  | Kowalski ...................... 180/68.6 |
| 7,766,112 | B2 | * | 8/2010  | Kapadia et al. ............... 180/68.4 |
| 7,802,643 | B2 | * | 9/2010  | Yajima ........................ 180/65.22 |
| 7,861,988 | B2 | * | 1/2011  | Hamida et al. ................ 248/232 |
| 8,002,072 | B2 | * | 8/2011  | Schmahl ........................ 180/274 |
| 8,191,664 | B2 | * | 6/2012  | Steller ........................... 180/68.4 |
| 8,246,105 | B2 | * | 8/2012  | Mildner .................... 296/187.09 |
| 8,312,951 | B2 | * | 11/2012 | Bui et al. ....................... 180/68.4 |
| 2001/0001994 | A1 | * | 5/2001  | Enomoto et al. .............. 180/68.4 |
| 2002/0129981 | A1 | * | 9/2002  | Satou ............................ 180/68.6 |
| 2007/0080009 | A1 | * | 4/2007  | Kowalski ...................... 180/68.6 |
| 2009/0085373 | A1 | * | 4/2009  | Terada et al. ............. 296/187.09 |
| 2009/0266633 | A1 | * | 10/2009 | Obayashi et al. ............. 180/68.4 |
| 2009/0266634 | A1 | * | 10/2009 | Obayashi et al. ............. 180/68.4 |
| 2010/0078149 | A1 | * | 4/2010  | Yoshimitsu et al. ............ 165/67 |
| 2010/0314426 | A1 | * | 12/2010 | Yokoi et al. .................... 224/555 |

FOREIGN PATENT DOCUMENTS

| EP | 1957346 | A1 | 8/2008 |
| EP | 1988005 | A1 | 11/2008 |

* cited by examiner

*Primary Examiner* — Jeffrey J Restifo
(74) *Attorney, Agent, or Firm* — Shook Hardy & Bacon LLP

(57) ABSTRACT

A front module for a motor vehicle includes two longitudinal members arranged one on either side, a bumper sitting in front of the two longitudinal members and connected to front ends of the longitudinal members with the interconnection of a respective deformation element, and a radiator frame arranged between the longitudinal members and supporting the cooling assembly. In a collision, the bumper, after the deformation of the deformation element, comes to bear against the radiator frame, wherein the radiator frame can then be displaced for a limited distance to the rear in the direction of the passenger compartment. After displacement or deformation of the radiator frame, the bumper (1) comes to bear against at least one point of the cooling assembly (5) in order to displace the latter to the rear in the direction of the passenger compartment.

16 Claims, 2 Drawing Sheets

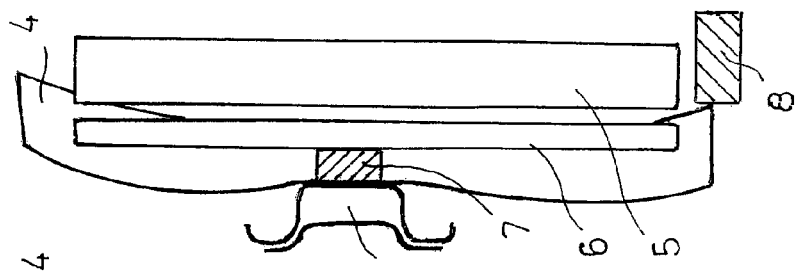
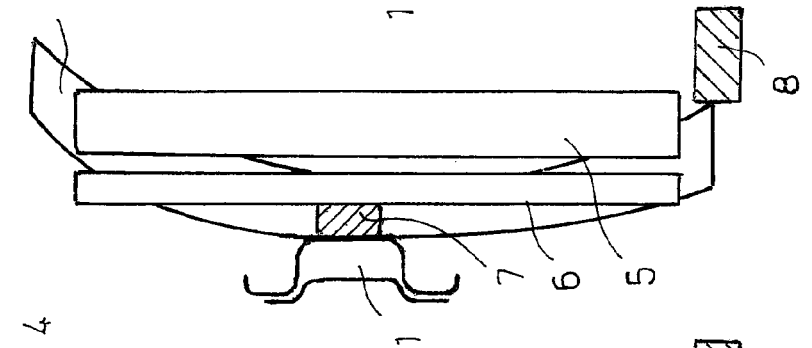
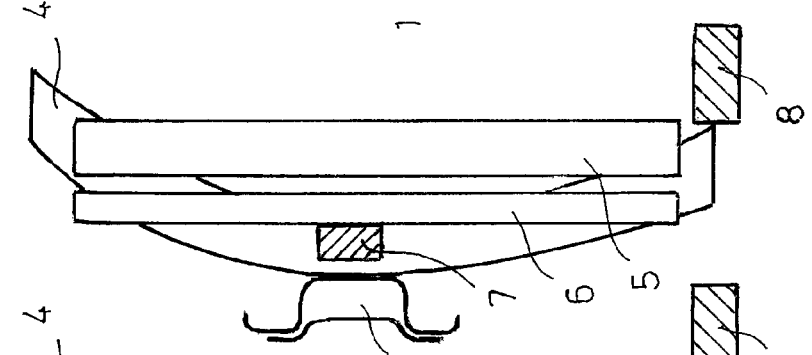
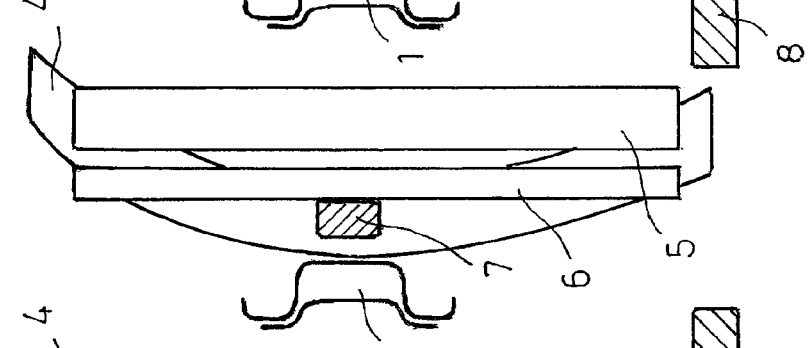
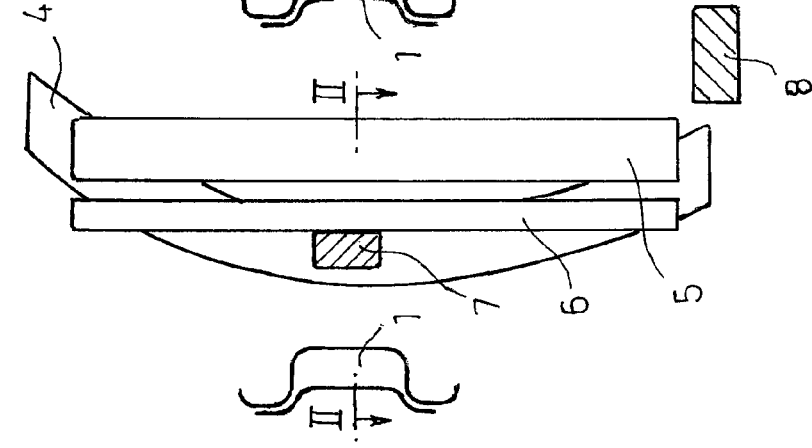

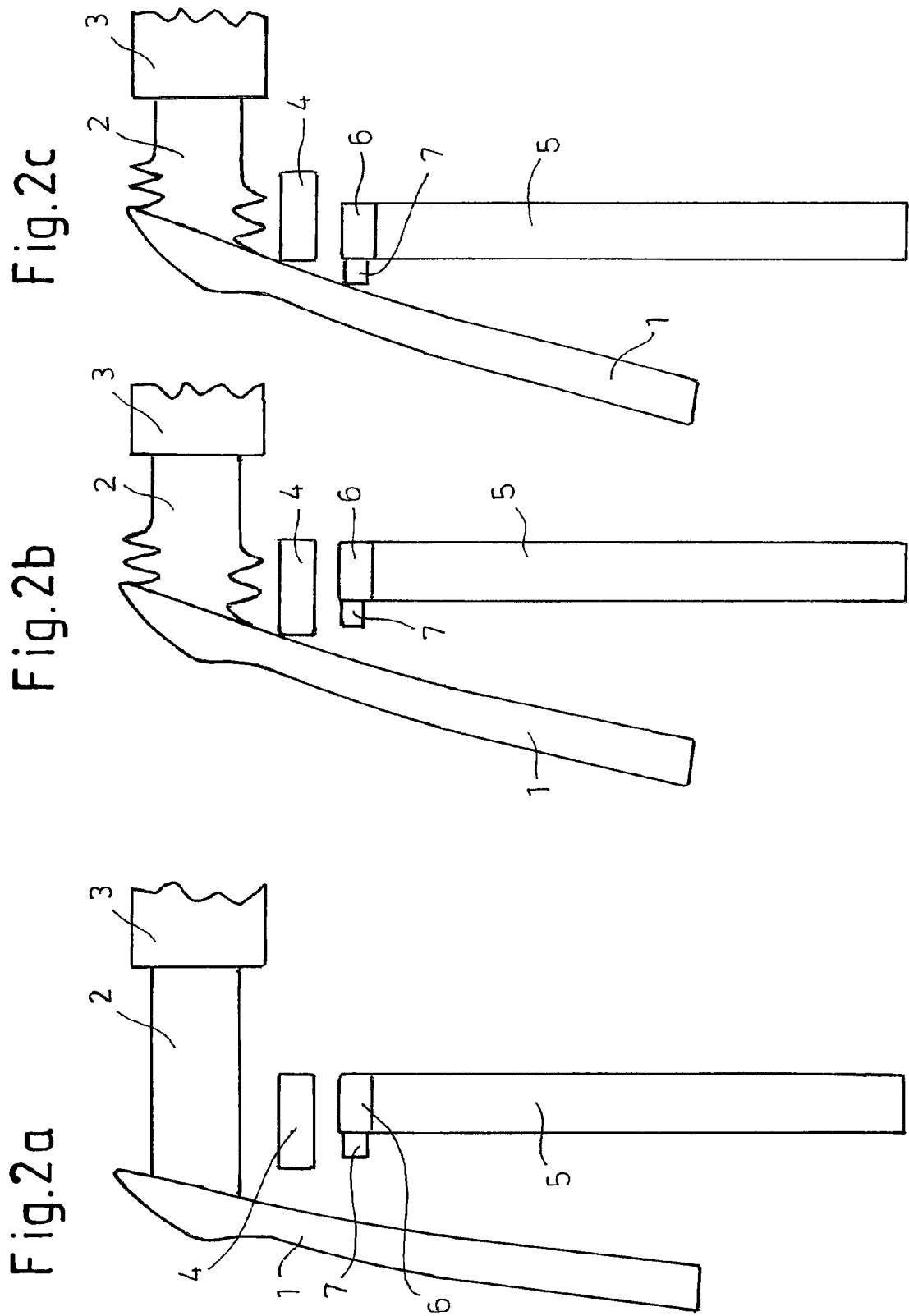

FRONT MODULE FOR A MOTOR VEHICLE

The invention relates to a front module for a motor vehicle with two longitudinal members arranged one on either side, a bumper support which sits in front of the two longitudinal members and is connected to the front ends of the longitudinal members with the interconnection of a respective deformation element, and a radiator frame which is arranged between the longitudinal members and between the deformation members and supports the cooling assembly.

It is known to configure the front modules of motor vehicles in such a manner that they absorb energy in a specific manner in the event of a collision. This is true for the protection of the occupants in the event of rear end collisions or frontal collisions and also for the protection of pedestrians who come into contact with the vehicle, in particular at relatively low vehicle speeds.

In addition to the protection of individuals, an important objective in the motor vehicle industry is also to ensure that functional components in the front region of the vehicle, for example the cooling assembly, are protected in order to keep the repair costs low after accidents. In order to approach this objective, various solutions have already been disclosed.

For example, it is known according to EP 1 988 005 to design the front construction in such a manner that the fastening of the cooling assembly to the supporting structure is formed by a frame in which the radiator is held and which, for its part, is anchored on the supporting structure via connecting elements which become detached from the supporting structure when a maximum force is exceeded.

Furthermore, it is known from EP 1 957 346 that the cooling assembly in the front region of the motor vehicle is fastened to a support element section which can be displaced if an external force which is greater than a predetermined value acts on the region. At the same time, however, at least one fastening state of the component to the support element is maintained, thus ensuring that the displaced component cannot drop out of the engine compartment onto the road and thereby be damaged.

However, these known examples do not suffice in order to obtain adequate protection of occupants and pedestrians and at the same to adequately protect the cooling assembly.

The invention therefore is based on the object of configuring a front module of the motor vehicle in such a manner that not only is there an improvement in the protection of occupants and pedestrians but also the radiator assembly is optimally protected in the event of a collision.

According to the invention, this object is achieved by the features of claim 1.

According thereto, in the event of a collision, the bumper support first of all, in a first deformation stage after the deformation of the deformation element or of the deformation elements, comes to bear against the radiator frame, wherein the radiator frame can then be displaced for a limited distance to the rear in the direction of the passenger compartment, and wherein, after displacement of the radiator frame in a second stage, the bumper support comes to bear against at least one point of the cooling assembly in order to displace the latter to the rear in the direction of the passenger compartment.

This two-stage deformation mechanism of the front module results in the creation of an extremely large deformation region which optimally absorbs the impact energy and protects both occupants and pedestrians while at the same time the radiator assembly remains undamaged.

For the first deformation stage, the displacement distance of the radiator frame is expediently limited by the latter striking against the lower frame part.

In addition, the radiator frame can be designed to be deformable per se, thus creating additional deformation clearance.

Furthermore, the bumper support, upon movement thereof to the rear at the beginning of the second deformation stage, can come to bear against the distributor box of the cooling assembly.

In this case, on both sides of the cooling assembly, a contact block can be arranged on the distributor box level with the bumper support, against which contact block the bumper support comes to bear at the beginning of the second deformation stage of the displacement thereof.

The contact block is preferably composed of elastic material, and therefore the deformation mechanism can be carried out gently and continuously, i.e., not jerkily.

Furthermore, the radiator frame can be designed so as to arch convexly toward the front side of the vehicle in order to serve as an additional deformation part.

The invention is illustrated by way of example in the drawing and described in detail below with reference to the drawing, in which:

FIG. 1 shows, in a schematic illustration, the side view of the front module, wherein five deformation steps a to e are illustrated, and FIG. 2 shows a section along the line II-II from FIG. 1, wherein three deformation steps a to c are shown.

According to the drawing, the front module according to the invention consists of a bumper support 1 which is connected on both sides via a respective deformation element 2 to the front ends of the longitudinal members 3, and a radiator frame 4 which is arranged between the longitudinal members 3 and between the deformation elements 2 and supports the cooling assembly 5. The radiator frame 4 is designed so as to be arched toward the front side of the vehicle and, owing to the fact that the bulging arch can be pressed in, provides an additional element for absorbing the impact energy. The cooling assembly 5 has, at least in the side regions thereof, a respective distributor box 6 on which a respective contact block 7 is arranged level with the bumper support 1, against which contact block the bumper support 1 can come to bear in the event of a collision. The contact block 7 is composed of elastic material, and therefore the contact phase between bumper support 1 and distributor box 6 or cooling assembly 5 is cushioned. A lower frame part 8 designed as a cross member is arranged in the lower region of the front module.

In FIGS. 1 and 2, subfigure a in each case illustrates the basic conception of the front module, in which deformation of the front module has not yet taken place and the bumper support 1 is in its normal position.

In the event of a collision, the bumper support 1 moves to the rear in the direction of the passenger compartment (not illustrated in the drawing) until it comes to bear against the radiator frame 4, as illustrated in FIG. 1 in subfigure b.

If the bumper support 1 moves further to the rear, it carries along the radiator frame 4 until the latter comes to bear, according to FIG. 1c, against the lower frame part 8. This configuration is illustrated in the top view in FIG. 2b, where it can be seen that, in this position, the deformation element 2 arranged between the longitudinal member 3 and the bumper support 1 has already been greatly deformed.

Upon further displacement of the bumper support 1 to the rear, the bumper support 1, by deformation of the radiator frame 4, as shown in FIG. 1d, is gradually placed against the elastic contact block 7, which is arranged on the distributor box 6 of the cooling assembly 5, and displaces the cooling assembly 5 in its entirety to the rear without the latter being damaged. This final state is shown in the side view in FIG. 1e.

This state can be seen in the top view in FIG. 1c, in which the bumper support 1 has compressed the deformation element 2 even further and has displaced the radiator frame 4 to the rear and deformed the radiator frame such that it comes to bear against the contact block 7, and has pushed the latter into a rearwardly displaced position in which the cooling assembly 5 is still undamaged.

As can be seen from the drawing, a two-stage deformation takes place in the event of a collision.

In the first stage, after the deformation of the deformation elements 2, the bumper support 1 is placed against the radiator frame 4 until it comes into contact with the contact block 7 provided on the distributor box 6. Up until this configuration, the cooling assembly 5 is still in its original position.

In the following, second deformation stage, the deformation elements are compressed even further, the radiator frame 4 is further deformed and the bumper support 1 is moved further to the rear in the direction of the passenger compartment, wherein the bumper support 1 carries along the cooling assembly 5 to the rear without the latter being substantially damaged initially.

The front module according to the invention therefore meets the demands imposed in two respects. Firstly, it provides good protection both for the occupants and for a pedestrian if the impact does not exceed a certain extent. Secondly, the cooling assembly 5 is very effectively protected since the first stage of the deformation takes place in front of the cooling assembly 5 while, in the second stage, the entire cooling assembly 5 is displaced, without the latter initially being damaged, for a distance to the rear in the direction of the passenger compartment by the bumper support 1 bearing against the contact blocks 7.

LIST OF REFERENCE NUMBERS

1. Bumper support
2. Deformation element
3. Longitudinal member
4. Radiator frame
5. Cooling assembly
6. Distributor box
7. Contact block
8. Lower frame part

The invention claimed is:

1. A front module for a motor vehicle comprising:
   two longitudinal members arranged one on either side,
   a bumper support which sits in front of the two longitudinal members and is connected to respective front ends of the longitudinal members with the interconnection of a respective deformation element,
   a radiator frame arranged between the longitudinal members and between the deformation members that supports a cooling assembly, which includes a distributor box, and
   one or more contact blocks coupled to the distributor box and aligned with the bumper support,
   wherein,
   in the event of a collision, the bumper support first of all, in a first deformation stage after the deformation of the deformation element or of the deformation elements, comes to bear against the radiator frame, wherein the radiator frame can then be displaced for a limited distance to the rear in the direction of the passenger compartment, and wherein, after displacement or deformation of the radiator frame in a second stage, the bumper support comes to bear against at least one point of the cooling assembly in order to displace the latter to the rear in the direction of the passenger compartment.

2. The front module as claimed in claim 1, wherein, for the first deformation stage, the displacement distance of the radiator frame (4) is limited by the latter striking against a lower frame part (8).

3. The front module as claimed in claim 2, wherein the radiator frame (4) can be deformed per se.

4. The front module as claimed in one of claim 2, wherein the bumper support (1), upon movement thereof to the rear at the beginning of the second deformation stage, comes to bear against the distributor box (6) of the cooling assembly (5).

5. The front module as claimed in claim 2, wherein the radiator frame is designed so as to arch convexly toward the front side of the vehicle.

6. The front module as claimed in claim 1 wherein the radiator frame is deformable.

7. The front module as claimed in one of claim 6, wherein the bumper support (1), upon movement thereof to the rear at the beginning of the second deformation stage, comes to bear against the distributor box (6) of the cooling assembly (5).

8. The front module as claimed in claim 6, wherein the radiator frame is designed so as to arch convexly toward the front side of the vehicle.

9. The front module as claimed in claim 1 wherein the bumper support, upon movement thereof to the rear at the beginning of the second deformation stage, comes to bear against the distributor box (6) of the cooling assembly (5).

10. The front module as claimed in claim 9, wherein, on both sides of the cooling assembly (5), a respective contact block (7) is arranged on the distributor box (6) level with the bumper support (1), against which contact block the bumper support (1) comes to bear at the beginning of the second deformation stage upon displacement of said bumper support to the rear.

11. The front module as claimed in claim 10, wherein the contact block (7) is composed of elastic material.

12. The front module as claimed in claim 11, wherein the radiator frame is designed so as to arch convexly toward the front side of the vehicle.

13. The front module as claimed in claim 10, wherein the radiator frame is designed so as to arch convexly toward the front side of the vehicle.

14. The front module as claimed in claim 9, wherein the radiator frame is designed so as to arch convexly toward the front side of the vehicle.

15. The front module as claimed in claim 1, wherein the radiator frame is designed so as to arch convexly toward the front side of the vehicle.

16. A front module for a motor vehicle comprising:
   two longitudinal members spaced apart from one another;
   a respective deformation element coupled to each longitudinal member;
   a bumper support coupled to the respective deformation elements;
   a radiator frame arranged between the longitudinal members and between the respective deformation elements that supports a cooling assembly having a distributor box; and
   one or more contact blocks coupled to the distributor box and aligned with the bumper support.

* * * * *